(No Model.) 3 Sheets—Sheet 1.
E. P. WARNER.
DYNAMOMETER.

No. 480,981. Patented Aug. 16, 1892.

Witnesses: Inventor:
Ernest P. Warner
By Barton & Brown
Att'ys (No Model.) 3 Sheets—Sheet 2.
E. P. WARNER.
DYNAMOMETER.

No. 480,981. Patented Aug. 16, 1892.

Witnesses:
Wm M. Rheem.
E. H. Wurdeman

Inventor:
Ernest P. Warner.
By Barton & Brown
Attys (No Model.) 3 Sheets—Sheet 3.
E. P. WARNER.
DYNAMOMETER.
No. 480,981. Patented Aug. 16, 1892.
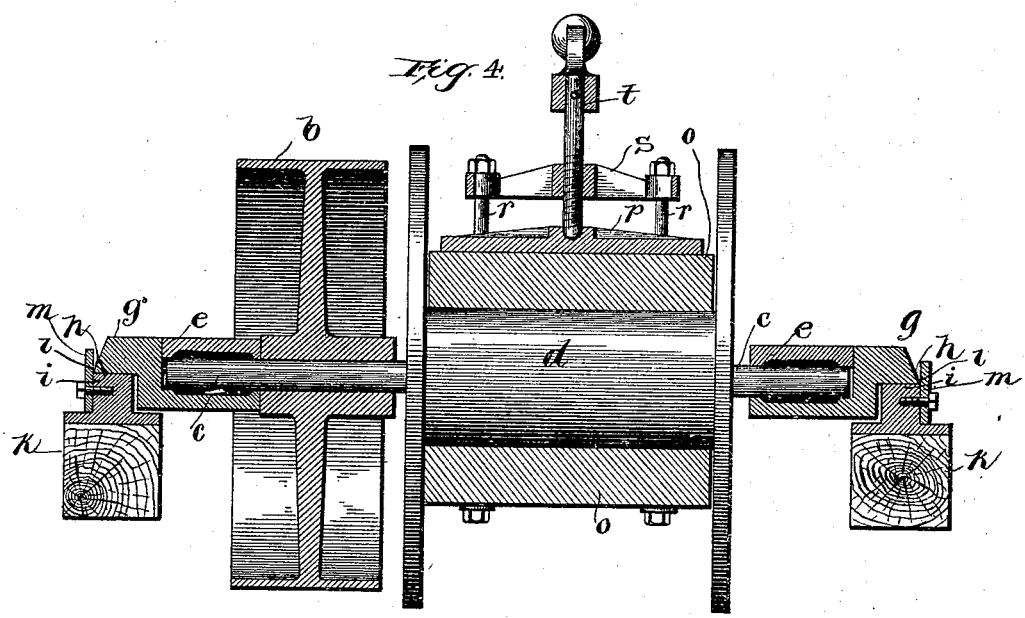
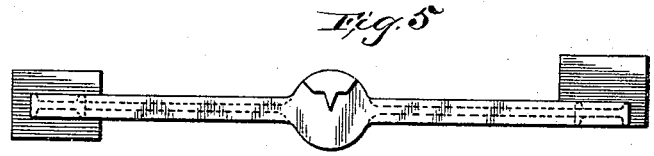
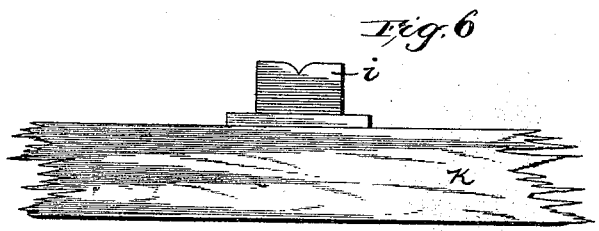
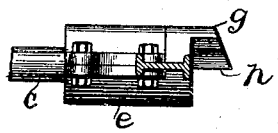
Witnesses:
George L. Cragg
E. Wurdeman
Inventor:
Ernest P. Warner:
By Barton & Brown
Attys.

UNITED STATES PATENT OFFICE.

ERNEST P. WARNER, OF CHICAGO, ILLINOIS.

DYNAMOMETER.

SPECIFICATION forming part of Letters Patent No. 480,981, dated August 16, 1892.

Application filed April 18, 1892. Serial No. 429,635. (No model.)

*To all whom it may concern:*

Be it known that I, ERNEST P. WARNER, a citizen of the United States, residing at Chicago, in the county of Cook and State of Illinois, have invented a certain new and useful Improvement in Dynamometers, (Case No. 40,) of which the following is a full, clear, concise, and exact description, reference being had to the accompanying drawings, forming a part of this specification.

My invention relates to an improvement in Prony brake-dynamometers.

It has for its object the elimination of the error which is present as a varying factor in the Prony brake-dynamometers as used heretofore, resulting from the friction of the journals, which has to be neglected in computation.

In my invention I measure the loss by friction of the journals, as well as the power absorbed by the friction of the applied brakes, by mounting the pulley to which the power is applied, the journals in which its shaft revolves, and the brake all upon a frame which is supported by knife-edge bearings upon a solid support. Measuring the torque which tends to cause the frame thus supported to turn on its knife-edge bearings enables me to measure the entire amount of power applied to the pulley and to eliminate entirely the error above referred to.

My invention consists, briefly, in any form of Prony brake in which knife-edges are placed in alignment with the friction-drum shaft, thus eliminating the error due to the friction of journals of said shaft in their bearings.

The accompanying drawings illustrate the apparatus that I make use of in carrying out my invention.

Figures 1, 2:
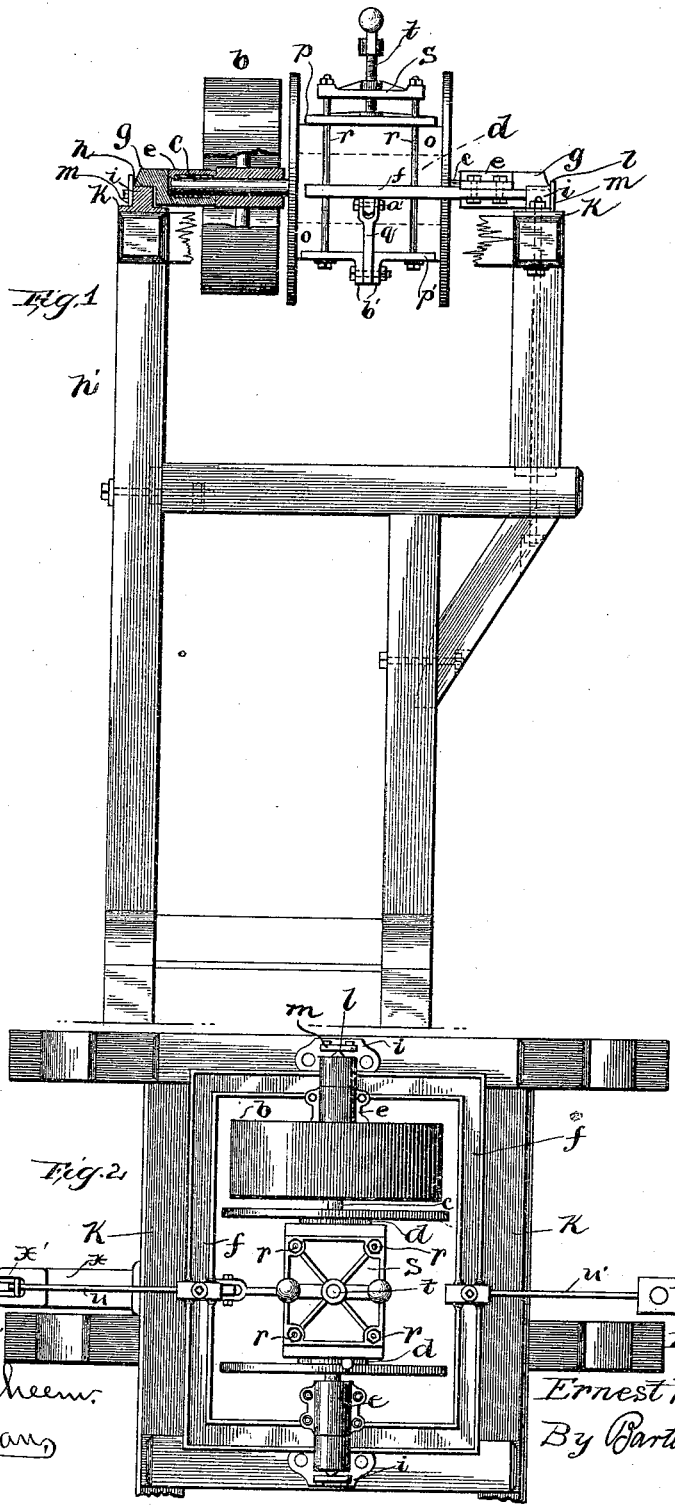
Figure 3:
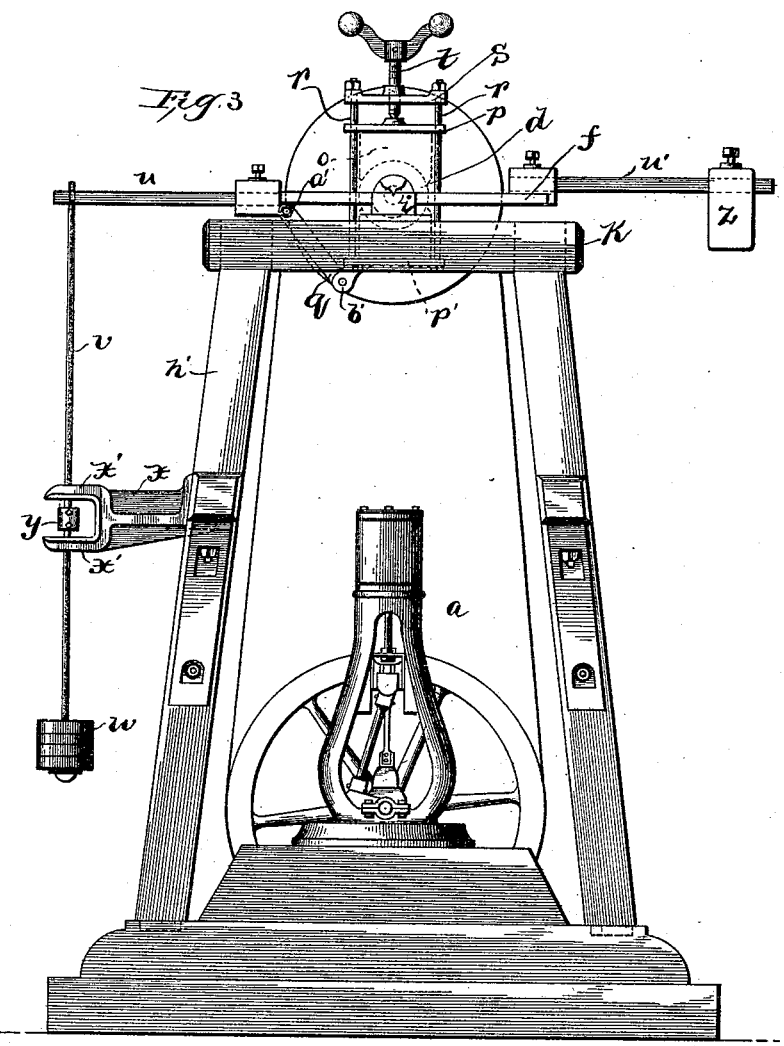

Figure 1 is a side elevation thereof. Fig. 2 is a plan view of the same. Fig. 3 is also a side elevation at right angles to view shown in Fig. 1. Fig. 4 is an elevation, partly in section, of the pulley, brake, shaft, drum, and friction-blocks. It also shows the journals and the bearings in the rectangular frame in section and the knife-edge bearings which support the rectangular frame. Fig. 5 represents an end view of the rectangular frame, showing the knife-edge bearing. Fig. 6 shows one of the blocks upon which the knife-edges are supported resting upon a detached portion of the supporting-frame. Fig. 7 is a view of the bearing in which the brake-shaft journals, showing the knife-edge and its alignment with the center of the shaft.

Similar letters of reference are used to indicate similar parts throughout the different views.

The power to be measured is applied by belting upward from the source, as shown in Fig. 3, where an engine $a$ is represented as belted to dynamometer-pulley $b$. This pulley is mounted upon a shaft $c$, which also carries the friction-drum $d$. This shaft is journaled in bearings $e\ e$, attached to the rectangular frame $f$, upon which are the projections $g$, formed into knife-edges $h$. These edges rest upon notched blocks $i\ i$, which are supported upon the frame $k$ to limit the end motion of the shaft and avoid friction. The projections $g\ g$ have their upper outside corners cut away, making the points $l\ l$ of the projections which bear upon the plates $m\ m$, which are attached to the blocks. Two disks are placed one each side of the friction-drum and attached to the friction-blocks $o\ o$, which are preferably of wood. The plates $p\ p'$ hold the blocks in place. The lower plate $p'$ is connected to the rectangular frame $f$ by the link $q$. The bolts $r\ r\ r\ r$ pass through the plates $p\ p'$ and are attached to the end plate $s$, through which the screw $t$ passes to the center of the plate $p$. Friction is applied to the friction-drum by turning the screw $t$. At right angles to a line connecting the knife-edge bearings the horizontal projecting arm $u$ carries the stirrup-rod $v$, adapted to carry weights $w$. Attached to the frame $h'$ is the arm $x$, having two projections $x'\ x'$, which act as limits to the motion of the arm $u$ by limiting the movement of the collar $y$, which is fastened to the stirrup-rod $v$. The two projections $x'\ x'$ are forked so as to partially surround the stirrup-rod $v$ and prevent its swinging about. Fastened, also, to the rectangular frame $f$ and on the opposite side of the arm $u$ is a horizontal arm $u'$, with an adjustable weight $z$ attached to compensate for the weight of the arm $u$ and stirrup-rod $v$. The link $q$ is fastened to the rectangular frame $f$ by the pivot $a'$. Upon plate $p'$ is the arm $b'$, pivotally connected to the link $q$.

As the friction-blocks $o\ o$ rest upon the friction-drum $d$, any rotary motion of the shaft tends, by reason of frictional engagement of the blocks with the drum, to rotate the rectangular frame $f$ through the connecting-link $q$. This tendency is resisted by the weights $w$, hung upon the stirrup-rod $v$. There is also a tendency to turn the rectangular frame arising from the friction of the journals in their bearings. This friction of the journals in their bearings tends to turn the rectangular frame in the same direction as does the friction of the friction-blocks $o\ o$ upon the friction-drum $d$, so that the torque tending to turn frame $f$ is the sum of the friction of the journals in their bearings and of the friction-blocks upon the friction-drum, and in balancing the rectangular frame $f$ upon its knife-edge bearings by means of the weights $w$ I am enabled to measure accurately the entire torque tending to cause the rectangular frame $f$ to turn, and by noting the speed of rotation of the shaft $c$ I can readily compute the foot pounds of power delivered to the pulley. Although it is well known that the friction of journals in their bearings varies within wide limits with variation in lubrication and pressure, still these variations do not in the apparatus of my invention introduce an element of error, as whatever the coefficient of the friction may be at any moment it is simply added to the friction of the friction-blocks.

The construction of the friction-blocks and friction-drum I have not shown in detail, as it is a well-known form, and, as is usual in apparatus of this kind, it is arranged to permit the application of water to the friction blocks and drum for the purpose of carrying off the heat into which the energy of the applied power has been rendered.

Various modifications of the device shown in the drawings may suggest themselves, and I do not wish to limit myself to the precise construction shown.

Having thus described my invention, I claim as new and desire to secure by Letters Patent—

1. In a dynamometer, the combination, with the friction-drum and its friction-blocks, of a shaft carrying said friction-drum and journaled in bearings supported upon knife-edges placed in alignment with the center of said shaft and means whereby the friction of said shaft-journals in their bearings is joined in effect to that given by the friction drum and blocks.

2. In a dynamometer, the combination, with the pulley $b$, the friction-drum $d$, and its blocks $o\ o$, of the shaft $c$, journaled in bearings $e\ e$ upon the frame $f$, the knife-edge bearings supported upon blocks $i\ i$, said knife-edge bearings being in alignment with the center of said shaft $c$, and the link $q$, connecting the friction-blocks with the frame $f$, whereby the friction of the friction-blocks $o\ o$ upon drum $d$ and the friction of the shaft-journals in bearings $e\ e$ communicate their added torque to the frame $f$, substantially as and for the purpose specified.

In witness whereof I hereunto subscribe my name this 13th day of February, A. D. 1892.

ERNEST P. WARNER.

Witnesses:
M. J. TALLETT,
GEORGE L. CRAGG.